G. W. MARSH.
Plow.
No. 84,563.
Patented Dec. 1, 1868.
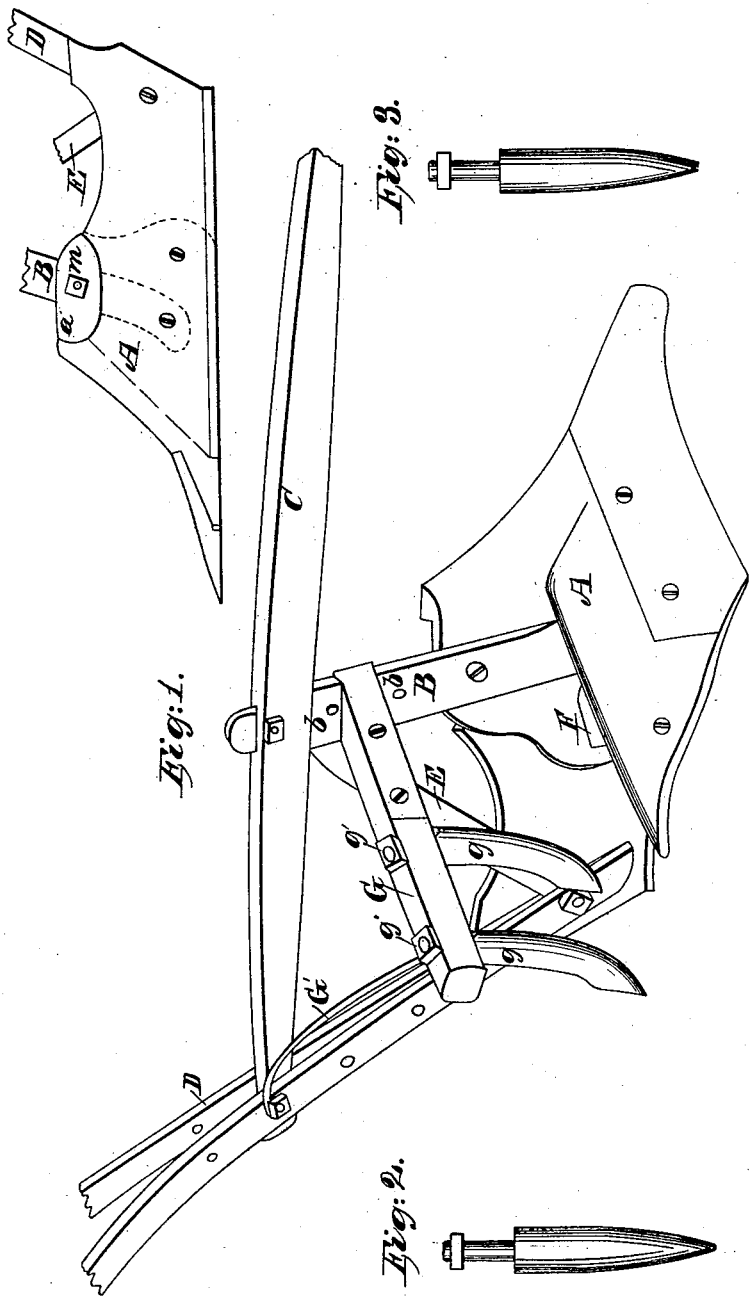

United States Patent Office.

GEORGE W. MARSH, OF CLINTON, NORTH CAROLINA.

Letters Patent No. 84,565, dated December 1, 1868.

IMPROVEMENT IN PLOWS.

The Schedule referred to in these Letters Patent and making part of the same.

*To all whom it may concern:*

Be it known that I, GEORGE W. MARSH, of Clinton, in the county of Sampson, and State of North Carolina, have invented a new and useful Improvement in Plows; and I do hereby declare the following to be a clear and exact description of the nature thereof, sufficient to enable others skilled in the art to which my invention appertains to fully understand and use the same, reference being made to the accompanying drawings, making part of this specification, in which—

Figure 1 is a perspective view of the plow, as seen from the mould-board side.

Figures 2, 3, and 4 are detached views of parts to be hereinafter referred to.

Similar letters of reference indicate corresponding parts in the several figures.

My invention has reference to plows for the cultivation of crops generally.

The improvement consists in constructing a plow in such a manner as to dispense with the upper portion of the mould-board, and admit of the application of a harrow-attachment, whereby the soil is pulverized as it passes behind the upturning portion of the plow.

In the drawings—

A may represent a plow, the several parts of which are put together in any known or desirable manner.

B is a shank, of wrought-iron, or other suitable material, connecting the plow A with the beam C, which is bolted to the handles D.

E is a brace, attached to the lower part of the handles, and the upper part of the shank or standard.

F is a brace, extending from the rear end of the mould-board to the landside portion of the plow, it being securely fastened to those parts by bolts and nuts.

By reference to the drawing, it will be seen that the mould-board is not so high as that of the common plow, and also that its approximately plane surface enables it to turn the soil slightly, if at all.

G is a beam, attached to the shank or standard B, and occupying a position parallel with the rear portion of the mould-board proper.

I insert in the beam G a number of blades, $g$, fig. 1, or teeth, such, for example, as those seen in figs. 2 and 3.

These blades or teeth, standing directly behind the mould-board, operate as a harrow, and they also break and reduce the soil as it rises over the mould-board. They not only serve as a means of pulverizing the soil, but being attached by their round shanks and held by nuts $g'$, they admit of adjustment, so that they may be made to act as deflectors, throwing the soil toward young plants, after the manner of some of the cultivators heretofore devised.

The apertures $b$, in the standard B, enable the attaching-bolt of the beam G to be shifted to a higher or lower point, and thus the said beam may be adjusted to suit the depth of plowing.

The beam G is provided with a brace, G', extending from said beam to the handles.

Fig. 4 presents a landside view of the plow A, in which side is provided a recess, $a$, which accommodates the nut $m$, holding the upper bolt, which fastens the standard B to the landside part of the plow.

It is obvious that by slight modifications, the above-described implement may be adapted for plowing or for cultivating separately, or for the two operations combined.

Having thus described my invention,

What I claim as new herein, and desire to secure by Letters Patent, is—

The combination, with a plow A, of a harrow-attachment, arranged and operating substantially as herein described and represented.

GEORGE W. MARSH.

Witnesses:
ALGERNON M. LEE,
ROBERT H. HUBBARD.